(12) United States Patent
Makagon et al.

(10) Patent No.: US 10,289,389 B2
(45) Date of Patent: *May 14, 2019

(54) AUTOMATED CALL CENTER SOFTWARE BUILD GENERATOR

(71) Applicant: Genesys Telecommunications Laboratories, Inc., Daly City, CA (US)

(72) Inventors: Petr Makagon, San Francisco, CA (US); Andriy Ryabchun, Mill Valley, CA (US); Nikolay Anisimov, Concord, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,480

(22) Filed: Oct. 3, 2016

(65) Prior Publication Data

US 2017/0024190 A1 Jan. 26, 2017

Related U.S. Application Data

(63) Continuation of application No. 14/846,705, filed on Sep. 4, 2015, now Pat. No. 9,459,841, which is a continuation of application No. 12/894,692, filed on Sep. 30, 2010, now Pat. No. 9,128,802.

(51) Int. Cl.
| | |
|---|---|
| *G06F 8/36* | (2018.01) |
| *G06F 8/71* | (2018.01) |
| *G06F 8/20* | (2018.01) |
| *G06F 8/30* | (2018.01) |
| *H04M 3/22* | (2006.01) |
| *H04M 3/51* | (2006.01) |

(52) U.S. Cl.
CPC .............. *G06F 8/36* (2013.01); *G06F 8/20* (2013.01); *G06F 8/31* (2013.01); *G06F 8/71* (2013.01); *H04M 3/2263* (2013.01); *H04M 3/5183* (2013.01)

(58) Field of Classification Search
None
See application file for complete search history.

(56) References Cited

U.S. PATENT DOCUMENTS

| | | | |
|---|---|---|---|
| 6,067,357 A | 5/2000 | Kishinsky et al. | |
| 7,010,780 B2 | 3/2006 | Perycz et al. | |
| 7,499,933 B1* | 3/2009 | Simpson | G06F 9/44505 |
| 7,590,570 B2* | 9/2009 | Harrison | G06Q 30/06 |
| | | | 705/26.1 |
| 9,128,802 B2 | 9/2015 | Makagon et al. | |
| 9,459,841 B2 | 10/2016 | Makagon et al. | |
| 2006/0080414 A1* | 4/2006 | Cohen | H04L 41/0879 |
| | | | 709/220 |
| 2006/0168573 A1* | 7/2006 | Clark | G06F 8/71 |
| | | | 717/140 |

(Continued)

*Primary Examiner* — Philip Wang

(57) ABSTRACT

A call center (CC) generator includes generator software (GSW) executing on a computerized appliance from a machine-readable physical medium, an input interface for receiving a CC configuration, access to a data repository storing CC software components, a function relating configuration parameters to individual ones of the stored CC software components, and an output interface for delivering a CC SW suite. The CC generator, executing the GSW, considers the CC configuration, applies the relating function, selects CC software components to copy from the data repository, and builds the CC SW suite for output.

16 Claims, 3 Drawing Sheets

(56) References Cited

U.S. PATENT DOCUMENTS

| | | | |
|---|---|---|---|
| 2007/0255830 A1* | 11/2007 | Alt | G06Q 10/06 |
| | | | 709/226 |
| 2008/0120598 A1* | 5/2008 | Imeshev | G06F 8/71 |
| | | | 717/120 |
| 2009/0041215 A1* | 2/2009 | Schmitt | G06F 9/45512 |
| | | | 379/88.17 |
| 2009/0089407 A1* | 4/2009 | Chalupa | G06F 15/16 |
| | | | 709/220 |
| 2012/0016712 A1* | 1/2012 | Kosiba | G06Q 10/04 |
| | | | 705/7.25 |
| 2015/0378686 A1 | 12/2015 | Makagon et al. | |

* cited by examiner

AUTOMATED CALL CENTER SOFTWARE BUILD GENERATOR

CROSS-REFERENCE TO RELATED APPLICATIONS

This application is a continuation of U.S. patent application Ser. No. 14/846,705, filed on Sep. 4, 2015, now U.S. Pat. No. 9,459,841, which is a continuation of U.S. patent application Ser. No. 12/894,692, filed on Sep. 30, 2010, now U.S. Pat. No. 9,128,802, the contents of all of which are incorporated herein by reference.

BACKGROUND OF THE INVENTION

1. Field of the Invention

The present invention is in the field of telephony communications including data network telephony and Internet protocol network telephony and pertains particularly to methods and apparatus for creating executable call center software suites.

2. Discussion of the State of the Art

In the field of telephony, call center software is available for performing call center tasks like transaction processing, service fulfillment, outbound customer contact, automated interactive voice response processing, messaging, email processing, chat, and other proactive contact services. State-of-art call centers provide both analog and digital transaction processing and other related services.

Many businesses that need call center services lease call center services from a third-party provider rather purchase the equipment and software required to configure their services locally. Other larger businesses have the resources to provide for their own call center services to run from their own premises. In both cases, configuring the call center services including customization and implementation involves many processes that currently are performed manually by administrators or knowledge workers.

With so many customizations and service levels possible in a call center environment, there is a need to automate the configuration process in order to save time and eliminate human error. Therefore, what is clearly needed is system for automatic generation of full service call center software suites for clients and potential tenants of a call center service provider.

SUMMARY OF THE INVENTION

The problem stated above is that automation is desirable for configuring call center services, but many of the conventional means for creating call center configurations and capabilities, such as software development kits, also create significant delay in implementing a fully functional call center service based on business needs of a client. The inventors therefore considered functional elements of call center development tools, looking for elements that exhibit interoperability that could potentially be automated to provide custom call center implementations but in a manner that would not require significant delay due to manual processing, data migration, and testing requirements.

Every call center implementation is characterized by current and predicted business needs of the client for whom services are provided, one by-product of which is an abundance of manual configuration and scaling. Most such call centers employ routers, computer telephony integration (CTI) servers, work force management tools, reporting tools, outbound contact modules, and the like to ensure that customers serviced by the center are serviced in an optimal and efficient manner that benefits both the customer and, hopefully, the business utilizing CC services. Such CC components are typically part of call center apparatus.

The present inventor realized in an inventive moment that if, at the point of need, a complete call center service paradigm could be automatically generated and implemented for a client based on the current and predicted needs of the client, significant reduction of or complete elimination of complicated manual implementation and configuration steps might result. The inventor therefore constructed a unique software build generator and system for generating call center service software that allowed service providers and call center hosting organizations to automatically generate customized call center service packages or suites for remote hosted or in-house implementation according to a set of communicated business requirements. A significant reduction or elimination of manual configuration steps results, with no impediment to the soundness of service implementation and function.

Accordingly, in an embodiment of the present invention, a call center (CC) generator is provided comprising generator software (GSW) executing on a computerized appliance from a machine-readable physical medium, an input interface for receiving a CC configuration, access to a data repository storing CC software components, a function relating configuration parameters to individual ones of the stored CC software components, and an output interface for delivering a CC SW suite. The CC generator, executing the GSW, considers the CC configuration, applies the relating function, selects CC software components to copy from the data repository, and builds the CC SW suite for output.

In one embodiment the CC configuration is a single digital file, readable by the CC generator. In a variation of this embodiment the file is expressed in XML or another markup language. In one embodiment the input interface is an interactive graphic user interface (GUI) providing functions for a user to enter configuration parameters, and to indicate when the input is final, signaling the generator to generate.

In one embodiment the stored CC SW components include one or more of files, drivers, scripts, database applications, communications applications, Web-based components, messaging applications, IVR components, routers, statistical information gatherers, CTI servers, multimedia queue systems, outbound servers, pacing algorithms, work force management applications, and resource scheduling applications. In one embodiment the CC SW suite is output with recommendations for hardware configuration to execute the CC SW suite. In one embodiment the CC SW suite is generated as one of downloadable software, a Software-as-a-Service (SaaS) suite, or is written to a CD, DVD or other physical medium.

In one embodiment the CC SW suite is formatted as an addition to an existing CC SW suite, adding functionality. In a variation of this embodiment the added functionality adds a hosted CC within a SW suite of a call center provider. In one embodiment the CC configuration includes estimates of call volume, which may be used by the generator to specify numbers of components required in the CC SW suite to be output.

According to one aspect of the present invention, a method is provided for generating a call center (CC), the method including the steps (a) executing generator software (GSW) on a computerized appliance from a machine-readable physical medium, (b) receiving a CC configuration at an input interface, (c) accessing a data repository storing CC software components, (d) relating configuration parameters to individual ones of the stored CC software components, and (e) delivering a CC SW suite at an output interface.

In one aspect of the method in step (b) the CC configuration is a single digital file, readable by the CC generator. In this aspect the file is expressed in XML or another markup language. In one aspect in step (b) the input interface is an interactive graphic user interface (GUI) providing functions for a user to enter configuration parameters, and to indicate when the input is final, signaling the generator to generate.

In one aspect of the method in step (c) the stored CC software components include one or more of files, drivers, scripts, database applications, communications applications, Web-based components, messaging applications, IVR components, routers, statistical information gatherers, CTI servers, multimedia queue systems, outbound servers, pacing algorithms, work force management applications, and resource scheduling applications. In one aspect in step (e) the CC SW suite is output with recommendations for hardware configuration to execute the CC SW suite. In other aspects in step (e) the CC SW suite is generated as one of downloadable software, a Software-as-a-Service (SaaS) suite, or is written to a CD, DVD or other physical medium.

In one aspect in step (e) the CC SW suite is formatted as an addition to an existing CC SW suite, adding functionality. In this aspect the added functionality adds a hosted CC within a suite of a call center provider. In one aspect of the method in step (b) the CC configuration includes estimates of call volume, which may be used by the generator to specify numbers of components required in the CC SW suite to be output.

BRIEF DESCRIPTION OF THE DRAWING FIGURES

DETAILED DESCRIPTION

The inventors provide a unique system for generating call center (CC) functionality for client deliverable CC implementations or for hosted CC services leased by clients. The system is described in enabling detail below using the following examples, which may describe more than one embodiment of the present invention.

Figure 1:
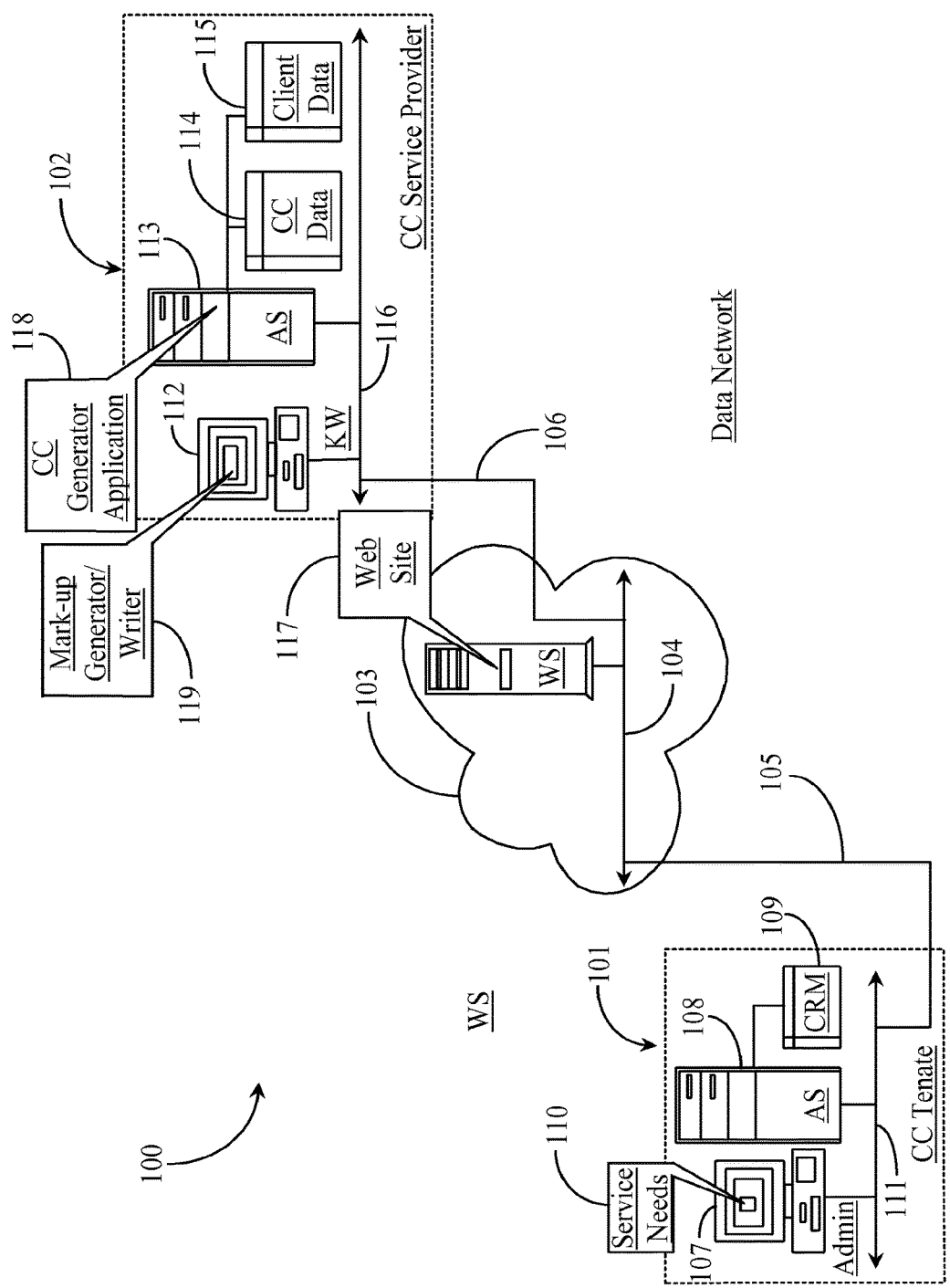
FIG. 1 is an architectural overview of a communications network that supports automated call center software generation according to an embodiment of the present invention.

FIG. 1 an architectural overview of a communications network 100 that supports automated call center software generation according to an embodiment of the present invention. Communications center 100 includes a data network 103, which in one embodiment, is the well-known Internet network. Data network 103 may be referred to herein as the Internet network also represented herein by a network backbone 104. Backbone 104 represents all of the lines, equipment, and access points that make up the internet network as a whole including connected sub-networks. Therefore, there are no geographic limitations to the practice of the present invention.

A call center service provider (CCSP) 102 is illustrated in this example. CCSP 102 may be any service provider having the capability of hosting call center services for any leasing tenants. CCSP 102 includes a LAN 116 having connection to Internet backbone 104 via a high speed Internet connection 106. CCSP 102 includes an application server (AS) 113. AS 113 includes a digital medium adapted to store software applications that are executable from the medium. AS 113 is connected to LAN 116. AS 113 includes a CC generator application 118 implemented in software and executable from the digital medium of the server.

CC generator application 118 is adapted to create a CC software configuration based on a needs specification supplied by a client and worked up into a suitable input specification by a knowledge worker (KW) 112. AS 113 has connection to at least one data repository 114 adapted to store CC data such as CC building blocks, which are objects representing specified CC components and service descriptions that may be required to fulfill certain call center services based on specific needs of a client. A second data repository 115 is provided and adapted to contain client data such as subscription data billing information, account information, and so on.

KW 112 is illustrated as a desktop computer connected to LAN 116 in this example. KW 112 hosts a markup language generator/writer 119 implemented as a software application on a digital medium generic to the computer, Application 119 may also be server-hosted without departing from the spirit and scope of the present invention. Application 119 may include a graphics user interface (GUI) through which common design tools are available.

Network 103 includes a Web server (WS) 120 connected to backbone 104. WS 120 may be leased or hosted by CC service provider 102. WS 120 includes a digital medium adapted as a physical medium for storing data. WS 120 is adapted as an information server that serves Web pages to clients over the network. One such Web site hosted on server 120 is illustrated herein as a Web site 117. Website 117 provides a customer access point to the services of service provider 102, more specifically CC generation and in some cases implementation services.

Communications network 100 includes a CC tenant 101. CC tenant 101 represents any business that requires telephony services in order to sell products or services. CC tenant 101 might be a law office that requires temporary CC services to alert the public about a class action lawsuit. CC tenant 101 might be a computer sales office that sells computers and service packages and that might require permanent CC functionality to run onsite. CC tenant 101 includes a LAN 111 having connection to Internet backbone 104 via a high-speed Internet connection line 105. In one embodiment, LAN 111 may have connection to backbone 104 through an Internet service provider (ISP) not illustrated here.

CC tenant 101 has an application server (AS) 108 connected directly to a LAN 111. AS 108 is responsible for serving telephony requirements and for conducting general telephony-related activities. As 108 includes a digital medium coupled thereto or otherwise made available there to. AS 108 may be adapted to contain CC applications that are executable from the physical digital medium of the server. These application types (not illustrated) may include but are not limited to SW applications like certain IVR applications and general or hosted CC apps. In one embodiment CC tenant 101 is independent and may perform call center services for its client without relying on third-party telephony services. However, in another embodiment, CC tenant 101 is a client of business 102 and has an account with them for leasing hosted CC services from the provider.

AS 108 is connected to a data repository 109 adapted to contain information about the customer base for customer relation management purposes. An administrator 107 is illustrated within tenant 103. Administrator 107 may be any authorized individual that can define what types of CC services are required to fulfill one or more permanent or temporary CC campaigns. Administrator 107 is illustrated as a desktop computer in this example connected directly to LAN 111. In another embodiment administrator 107 may be a wireless computing device like a Laptop or notebook computer, a personal digital assistant, or another device that may be connected to LAN 116.

Administrator 107 accesses WS 120 in Internet 103 and Website 117 maintained by CC service provider 102. In one embodiment, administrator 107 is served an application or interface 110 labeled service needs in this example. Interface 110 may be a dialog box on Website 117, a GUI downloaded from the Website, or a plug-in that enables the administrator to communicate CC service needs to CC service provider 102. In one embodiment the administrator or other authorized tenant representative creates a document or some other text-based form that defines the projected service needs of the tenant business relative to CC services required to enable full call center services to reach the clients of the business.

Service needs 110 are communicated eventually to KW 112 running markup generator/writer 119. SW 119 includes all of the scripting tools and markup language components required to create a formal CC needs specification or CC configuration (CFG) file for the tenant written in a high-level language such as an XML-based markup language that can be understood by the CC generator application 118 running on server 113. The CC needs specification or CFG file may, in one embodiment, be a single data file that may be input into the CC generator application 118 to generate a formal CC suite that contains all of the SW components and executables required to provide full CC services for that individual tenant using equipment belonging to the tenant. In another embodiment the generated CC suite is implemented at the premise of the CC service provider on behalf of the tenant as a subscribed CC service using the service provider's equipment.

The output file or CC suite may be written to a removable medium such as a compact disc (CD) or a digital video disc (DVD) that can be delivered to a tenant business for tenant installation. In an alternate embodiment of the invention, the CC suite may be provided as a downloadable installation that may be downloaded through Website 117. In still another embodiment the CC suite output from the CC generator may be provided as a Software as a Service (SaaS) that may be held by the service provider but that can be implemented either client side or service side. There are many possibilities.

Referring now back to CC service provider 102, CC generator application 118 parses the CC CFG input file and then accesses data repository 114 to access the required CC components, which comprise routing servers, work force management servers, multimedia contact servers, outbound contact servers, computer telephony integration (CTI) servers, reporting applications, statistical servers, and other CC components and optimizations that may or may not be required but may be ordered to enhance any particular generated CC suite. In one embodiment a CC suite is generated as an enhancement or service upgrade to an existing CC suite operated on behalf of the tenant by the CC service provider. The added functionality may include added services like outbound call pacing, load balancing, predictive resource allocation, and many other CC optimizations that may be installed over an existing SW suite.

Figure 2:
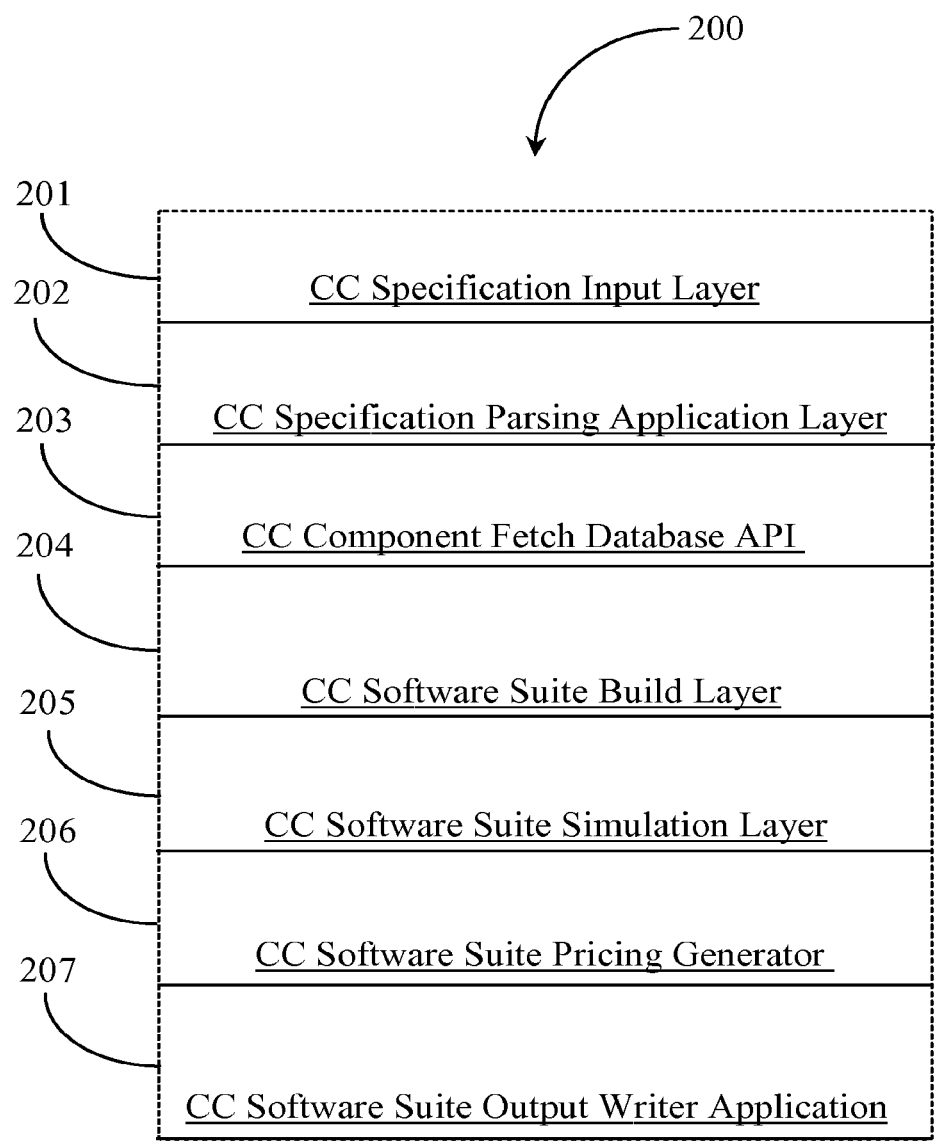
FIG. 2 is a block diagram illustrating software layers of an automated call center software generator according to an embodiment of the present invention.

FIG. 2 is a block diagram 200 illustrating basic software layers of an automated call center software generator according to an embodiment of the present invention. Block diagram 200 includes logical SW layers required to enable function as a CC SW suite generator. Block 200 includes a CC specification input layer 201 that is adapted to serve as an input interface for receiving the marked-up CFG files required to generate a CC suite. Layer 201 may include one or more queues for queuing CC generation tasks. Block 200 includes a CC specification parsing application layer 202 adapted to parse the input file written in an XML-based markup language. The parser can read the input file or files and may categorize all of the CC requirements of the tenant. A CC requirement of the tenant might include one or more forecasts relative to incoming call volume and the like so that a sufficient number of CC components and sufficient levels of functionality are added to the package.

Block 200 includes a CC component fetch database application program interface (API) 203 that is adapted to access a components database like repository 114 of FIG. 1 to get the required components needed to fulfill the tenants CC requirements. The exact number and descriptions of SW components like servers and routers for example, depend on the CC CFG file input into the system. Block 200 includes a CC SW suite build layer 204 adapted to connect the various SW components fetched from the database together for correct CC functionality. The process assembles a customized fully functional SW suite that is designed to run on specified equipment types. The build layer may recommend certain equipment types and numbers based on projected needs of the tenant.

Block 200 includes a CC SW suite simulation layer 205. Simulation layer 205 may include a SW suite testing facility that can simulate the CC environment described in the needs specification of the tenant and test the efficiency of the built CC suite in handling simulated calls, reports, and so on. If the simulator indicates that there may be some problem like a missing component or that call processing is not optimized because of more resources required, the simulation layer can make recommendations to the build layer to add certain components, reconfigure components, add processing power, etc.

Block 200 includes a SW suite pricing generator 206 as an optional layer adapted to price a complete customized SW suite that may be delivered to a client for use at the client's premises or that might run at the CC service provider's premises on behalf of the client (leased services). Block 200 includes a CC SW suite output writer application 207 adapted to write or render the complete SW package to one or more CDs or DVDs, or to other removable mediums. In one embodiment, a complete CC suite is provided to the tenant as a SaaS package that can be accessed remotely or downloaded to the tenant location and run using hosted computing power and data storage hosted online by one or more third-party services.

Figure 3:
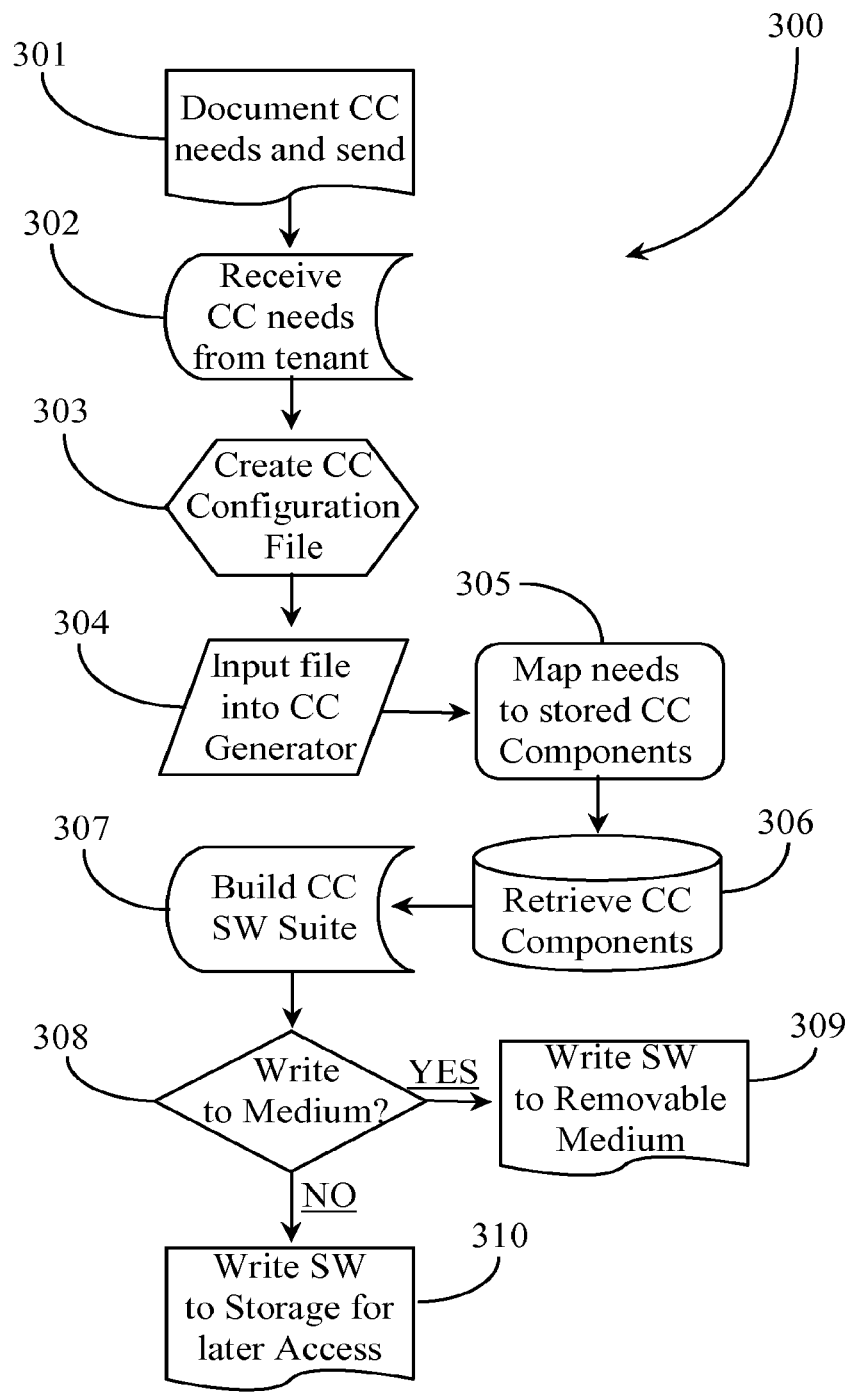
FIG. 3 is a process flow chart illustrating steps for automating call center software generation according to business needs of a tenant.

FIG. 3 is a process flow chart 300 illustrating steps for automating call center software generation according to business needs of a tenant. At step 301 a client is documents its call center needs. In this step the client communicates a variety of CC needs to the service provider. CC needs include number of limes, projected call volumes, projected outbound contact requirements, projected workforce requirements, and any other data that may be projected and may be identified as a potential requirement of the tenant relative to CC needs.

At step 302 a knowledge worker or other authorized agent of the service providing company receives the CC needs from the client or potential tenant. The CC needs may include CC needs that were not originally addressed by a first generated CC SW suite whereby those needs require further SW options or features to address them for the client. At step 303 the knowledge worker creates a CC configuration file using an XML-based markup language or some other suitable markup that is machine readable language. The CC configuration file presents the CC needs list of the client or potential tenant in a machine readable language that enables the automated generation of the required SW components to build the CC according to the configuration file. In one embodiment the KW invokes a special GUI that is used both to receive the CC needs specification and to get the proper markup constructs to create the CC configuration file that will address all of the CC needs presented in the specification.

At step 304, the KW inputs the CC configuration file into the CC SW generator analogous to the CC generator application 118 of FIG. 1. At step 305 the CC generator parses the CC configuration file and maps the CC needs specified by the client and presented in markup to the required SW components or "build blocks" that are stored in a repository accessible to the generator application. At step 306 the SW CC generator application retrieves or gets the CC components that are required to fulfill the CC needs of the client or potential tenant.

At step 307, the SW CC generator application builds a CC SW suite for the client or potential tenant from the retrieved components. The suite includes all of the required executable files, drivers, scripts, database applications, communications applications, Web-based components, messaging applications, IVR components, routers, statistical information gatherers, CTI servers, multimedia queue systems, outbound servers, pacing algorithms, work force management applications, resource scheduling applications, and so on. The complete CC suite includes everything required to install and implement a complete CC system client-side or at the service providers' location to run at the service provider's end.

At step 308, the system determines if the CC suite created at step 307 should be written to a removable medium such as a CD-ROM, DVD, or other removable medium, or if the CC suite should be written to storage for latter access to launch on behalf of the client in a service/tenant arrangement. If at step 308 the order is to write the SW to a medium, the system writes the SW to the prescribed medium at step 309. If the system determines at step 308 that the SW suite should be written to storage for latter access, the system writes the SW to a storage repository at step 310. In this event, the system may execute the SW suite from the storage as required to fulfill the needs of the client in a service/tenant arrangement.

In one embodiment process flow chart 300 includes at least one additional step before writing or rendering the finished SW for testing the SW suite for capacity, scalability, accuracy, and efficiency. In simulation, the system may require at least one testing sequence for every function that the CC suite is capable of performing when executed and responding to simulated call volumes. In another embodiment there may be certain manual operations required of the client that will run the CC suite using their own equipment and network. Such manual operations may include creating or finishing IVR scripts, assigning queues to agent groups, filling in product and pricing information, setting access passwords, and other like tasks.

It will be apparent to one with skill in the art that the CC SW suite build system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method for generating a contact center software suite for a service provider to host a contact center for a tenant, the method comprising:
receiving from the tenant, by a computer system of the service provider, a machine-readable specification of a plurality of requirements of the contact center for the tenant;
identifying, by the computer system, a plurality of components that fulfill the plurality of requirements of the contact center, the plurality of components comprising at least one of a routing server, a computer telephony integration server, a workforce management server, a statistics server, and an outbound contact server;
determining, by the computer system, a plurality of configuration parameters for the plurality of components to fulfill the plurality of requirements of the contact center; and
generating, by the computer system, a software suite for the contact center, the software suite comprising the plurality of components and the plurality of configuration parameters.

2. The method of claim 1, further comprising storing the software suite in a storage repository of the service provider.

3. The method of claim 1, wherein the plurality of requirements comprises an estimated call volume,
wherein the method further comprises allocating, by the computer system, one or more hardware resources to the contact center for the tenant, the one or more hardware resources being allocated from a plurality of equipment of the service provider,
wherein the plurality of configuration parameters comprises at least one number of components determined in accordance with the estimated call volume, and
wherein the allocating the one or more hardware resources comprises allocating a number of resources based on the at least one number of components.

4. The method of claim 1, wherein the plurality of configuration parameters comprises equipment types.

5. The method of claim 1, further comprising simulating the operation of the software suite in accordance with the plurality of requirements.

6. The method of claim 1, wherein the machine-readable specification is in a computer-markup language.

7. The method of claim 1, wherein the plurality of components further comprises at least one of:
an interactive voice response component;
a multimedia queue system;
a pacing component; and
a resource scheduling application.

8. The method of claim 1, further comprising generating the machine-readable specification in response to receiving the plurality of requirements of the contact center from the tenant via a graphical user interface hosted by a server of the computer system of the service provider.

9. A service provider system for generating a contact center software suite for a contact center for a tenant, the service provider system comprising:
   a plurality of equipment of a service provider;
   a processor; and
   memory having instructions stored thereon that, when executed by the processor, cause the processor to:
      receive, from the tenant, a machine-readable specification of a plurality of requirements of the contact center for the tenant;
      identify a plurality of components that fulfill the plurality of requirements of the contact center, the plurality of components comprising at least one of a routing server, a computer telephony integration server, a workforce management server, a statistics server, and an outbound contact server;
      determine a plurality of configuration parameters for the plurality of components to fulfill the plurality of requirements of the contact center; and
      generate a software suite for the contact center, the software suite comprising the plurality of components and the plurality of configuration parameters.

10. The service provider system of claim 9, wherein the service provider system further comprises a storage repository,
   wherein the memory further has instructions stored thereon that, when executed by the processor, cause the processor to store the software suite in the storage repository.

11. The service provider of claim 9, wherein the plurality of requirements comprises an estimated call volume,
   wherein the memory further has instructions stored thereon that, when executed by the processor, cause the processor to allocate one or more hardware resources to the contact center for the tenant, the one or more hardware resources being allocated from the plurality of equipment of the service provider,
   wherein the plurality of configuration parameters comprises at least one number of components determined in accordance with the estimated call volume, and
   wherein the instructions to allocate the one or more hardware resources comprises instructions that, when executed by the processor, cause the processor to allocate a number of resources based on the at least one number of components.

12. The service provider system of claim 9, wherein the plurality of configuration parameters comprises equipment types.

13. The service provider system of claim 9, wherein the memory further has instructions stored thereon that, when executed by the processor, cause the processor to simulate the operation of the software suite in accordance with the plurality of requirements.

14. The service provider system of claim 9, wherein the machine-readable specification is in a computer-markup language.

15. The service provider system of claim 9, wherein the plurality of components further comprises at least one of:
   an interactive voice response component;
   a multimedia queue system;
   a pacing component; and
   a resource scheduling application.

16. The service provider system of claim 9, wherein the memory further has instructions stored thereon that, when executed by the processor, cause the processor to:
   host, on a server of the service provider system, a graphical user interface configured to receive the plurality of requirements of the contact center from the tenant; and
   generate the machine-readable specification in response to the plurality of requirements received via the graphical user interface.

* * * * *